Patented June 24, 1930

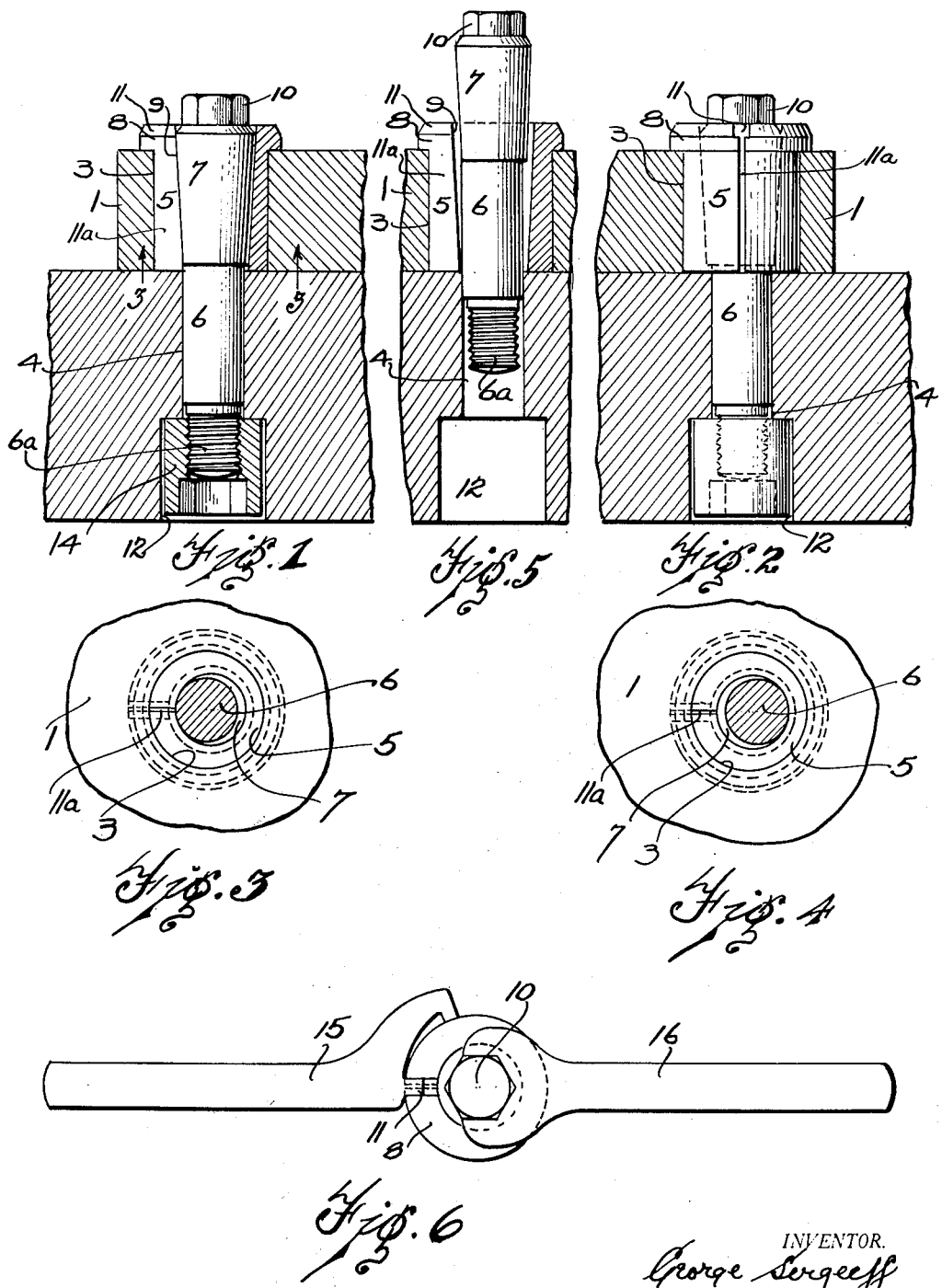

1,767,019

UNITED STATES PATENT OFFICE

GEORGE SERGEEFF, OF DETROIT, MICHIGAN

DOWEL

Application filed April 8, 1927. Serial No. 181,927.

This invention relates to improvements in dowels, by which pieces of material are so held that they cannot move with respect to one another at right angles to the axes of the dowels.

The ordinary type of dowel now in general use consists of a substantially circular pin which is inserted through a hole in one piece of material into a second hole in another piece of material; the holes are of such size that the dowel is an exact fit into both holes so that the latter must remain almost absolutely in line with one another. In such cases for instance as where dowels are to be re-inserted through punch plates into holes in a press shoe it is frequently found impossible to replace all of them in their old holes on account of shrinkage and stresses to which the plates and shoe have been subjected, and in consequence some of the holes have to be plugged and fresh ones drilled and reamed, which involves a considerable amount of time, labor, and skill.

It is an object of the present invention to provide a dowel that may be inserted through one hole and into a second either when the two holes are exactly in line with one another, or when one hole is substantially parallel with but somewhat eccentric to the other hole; and to so construct the dowel that by merely turning one portion of it with respect to the other the concentricity of the two portions which engage the bore of the two holes may be changed to eccentricity of greater or lesser extent.

Another object of the invention is to provide a dowel so constructed that there is no tendency, in fact practically no possiblity whatever, for the eccentricity or concentricity of the dowel portions to change once the dowel has been placed in position.

A further object of the invention is to provide a dowel by which two pieces of material may not only be held in a plane at right angles to its axis, or axes, but also in a plane substantially parallel with the axis, or axes, of the dowel. It will be noted that in the latter case the dowel serves not only the purpose of an ordinary dowel but also functions as a bolt, or other fastening means between the two pieces of material as well.

Having thus outlined the purposes of the invention I will now proceed to describe an embodiment thereof with the aid of the accompanying drawings, in which:

Figure 1 illustrates a sectional elevation of the invention in position in two pieces of material, and Figure 2 shows a side elevation thereof with the dowel turned through substantially ninety degrees.

Figure 3 is a section on the line 3—3 of Figure 1 showing how the eccentricity of the sleeve bore may offset the eccentricity of the shank of the other portion thereby bringing the two bearing portions of the dowel into concentricity one with the other.

Figure 4 is a similar section but with the sleeve and shank so turned that maximum eccentricity between the bearing portions of the dowel is obtained.

Figure 5 is a sectional elevation showing the pin being inserted into the sleeve.

Figure 6 is a plan view showing wrenches on the dowel portions illustrating the preferred way of turning these portions with respect to one another.

Referring to the drawings, 1 and 2 designate two pieces of material having holes 3 and 4 respectively therethrough. It will be noted that the hole 3 is materially larger than the hole 4.

The dowel consists of two portions, a split sleeve 5 and a pin 6 having an eccentric shank 7 integral with one of its ends. The split sleeve is preferably provided with a flange 8 at one end, and has an eccentric bore 9 which is so tapered that its diameter is greatest at its end adjacent to the flange 8. The eccentric shank 7 is also tapered to coact with the sleeve bore 9, and the eccentricity of the shank 7 with respect to its pin 6 is preferably equal to the eccentricity of the bore 9 with respect to its sleeve 5.

The end of the shank 7 remote from the pin 6 is provided with turning means which usually takes the form of a multi-sided head 10 of such size that it may pass freely into the bore of the sleeve. The flange 8 of the sleeve 5 is likewise provided with turning means which generally consists of a slot 11 of increased width at the upper end of the split 11ᵃ which extends longitudinally of the sleeve.

In cases where the hole 4 penetrates the whole thickness of the material 2, and where the opposite side of the latter is accessible, the end of the hole 4 remote from the material 1 may be counterbored as indicated at 12. In that case a threaded end 6ᵃ concentric with the pin 6 and of slightly less diameter than the latter is provided thereon for a nut 14. Moreover the type of nut usually employed is one wherein a multi-sided countersunk opening 14ᵃ is provided therein for turning it so that the whole of the latter lies in the counterbore 12.

The method of application of the dowel is as follows: When the pieces of material 1 and 2 are in correct relative position, if it is found that the holes 3 and 4 are absolutely in line the sleeve 5 is so turned with respect to the shank 7 that the eccentricity of its bore offsets the eccentricity of the shank with respect to its pin 6, as shown in Figure 3. If, on the other hand, the two holes are not in line with one another the sleeve and shank must be turned with respect to one another until the periphery of the former is eccentric a like amount with the pin 6.

On account of the fact that the sleeve is split, and its bore is tapered to cooperate with the taper of the shank, the fact of driving the pin downwards into its hole causes the sleeve to spread and engage the bore of the hole 1, so that when desired the threaded end 6ᵃ may be left off the pin with the assurance that the dowel will remain in position. But when the threaded end 6ᵃ and nut 14 are used the dowel in addition to holding the two pieces of material at right angles to the axis, or axes, of the dowel, also performs the function of fastening means for holding the pieces of material substantially parallel with the axis, or axes, of the dowel, so that set screws or other fastening means may be dispensed with.

In Figure 5 wrenches 15 and 16 are shown in engagement with the head 10 of the shank 7 and the flange 8 of the sleeve 5 respectively, to illustrate a simple means of setting the two portions with respect to one another.

While in the foregoing the preferred embodiment of the invention has been described and shown, it is understood that the construction is susceptible to such modifications as fall within the scope of the appended claim.

What I claim as my invention and desire to secure by Letters Patent is:

A dowel comprising a pin having an eccentric, tapered, shank portion, and provided adjacent one end of said eccentric portion with tool engaging means, the opposite end of the pin being threaded, and a split sleeve of substantially uniform diameter throughout its length having an eccentric tapered bore receiving and cooperating with the tapered shank portion of the pin, substantially as and for the purpose described.

GEORGE SERGEEFF.